July 18, 1961 B. L. MIMS ET AL 2,993,184
BALL BEARING VARIABLE RESISTOR
Filed Feb. 4, 1960 2 Sheets-Sheet 1

INVENTORS
BRUCE L. MIMS
HENRY KONET
BY
Henry L. Shewier
ATTORNEY

July 18, 1961  B. L. MIMS ET AL  2,993,184
BALL BEARING VARIABLE RESISTOR
Filed Feb. 4, 1960  2 Sheets-Sheet 2
Fig 7
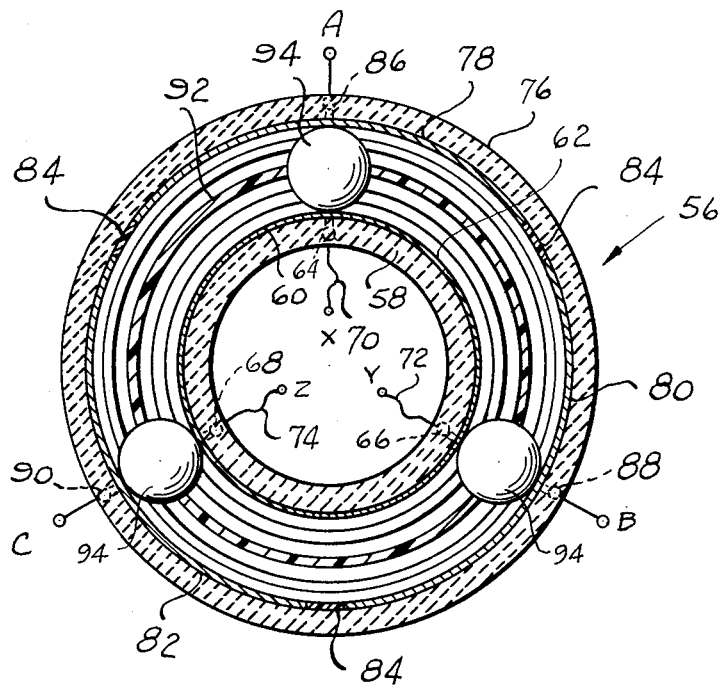
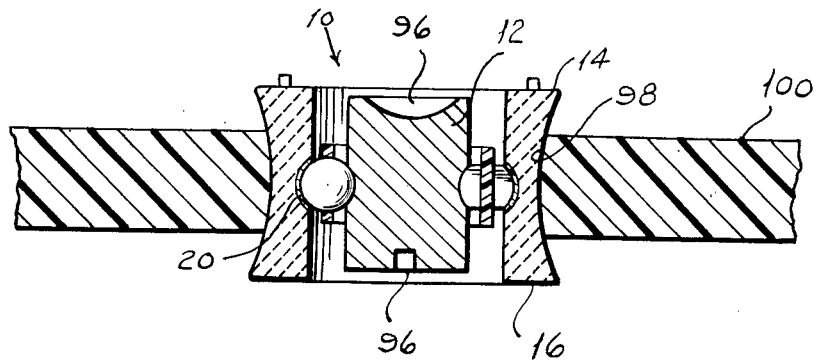
Fig 8
INVENTORS
BRUCE L. MIMS
HENRY KONET
BY
ATTORNEY

United States Patent Office 2,993,184
Patented July 18, 1961

2,993,184
BALL BEARING VARIABLE RESISTOR
Bruce L. Mims, Danbury, Conn., and Henry Konet, Hohokus, N.J., assignors to The Barden Corporation, Danbury, Conn., a corporation of Connecticut
Filed Feb. 4, 1960, Ser. No. 6,763
6 Claims. (Cl. 338—174)

Our invention relates to a ball bearing variable resistor and more particularly to an improved variable resistor which is small and compact.

Various types of potentiometers and variable resistors are known in the prior art. Many of these devices include a shaft carrying a brush which slides along a resistance winding as the shaft rotates. The brush must contact the resistance winding with sufficient pressure to make good electrical contact. These devices employ bearings for supporting the brush shaft for rotation with respect to the winding. Sufficient torque must be applied to the brush shaft to overcome both the bearing friction and the frictional resistance to movement of the brush over the winding. While these devices are satisfactory for most uses, there are many applications for which they are unsuitable owing to various characteristics of the devices such, for example, as their relatively large size, the high torque required to drive the shafts, and the low heat capacity of the devices.

We have invented a ball bearing variable resistor which is extremely small and compact as compared with potentiometers and variable resistors of the type known in the prior art. At least one rolling element of our device performs both its normal function of rotatably supporting a shaft and the function of an electrical element which moves along a resistance element to provide a variable resistance. The torque required to drive the movable element of our variable resistor is low as compared with the torque required to drive the movable element of potentiometers and rotary variable resistors of the prior art. Our ball bearing variable resistor has a high heat capacity and may be operated at a high speed. Our variable resistor is highly reliable and has long life.

One object of our invention is to provide a ball bearing variable resistor which is small and compact.

Another object of our invention is to provide a ball bearing variable resistor, the shaft of which requires a low torque as compared with the shafts of rotary variable resistors of the prior art.

A further object of our invention is to provide a ball bearing variable resistor which has a high heat capacity.

Still another object of our invention is to provide a ball bearing variable resistor which can operate at high speed.

A still further object of our invention is to provide a ball bearing variable resistor which is highly reliable and which has a long life.

Other and further objects of our invention will appear from the following description.

In general our invention contemplates the provision of a ball bearing variable resistor having inner and outer bearing rings and rolling elements, at least one of which performs both its normal function of supporting a member such as a shaft or the like and the additional function of making electrical contact between a resistance element on one of the rings and a conductive element on the other of the rings.

In the accompanying drawings which form part of the instant specification and which are to be read in conjunction therewith and in which like reference numerals are used to indicate like parts in the various views:

FIGURE 7 is a sectional view of a further form of our ball bearing variable resistor.

FIGURE 8 is a sectional view of our ball bearing variable resistor illustrating one application of the device.

Figure 1:
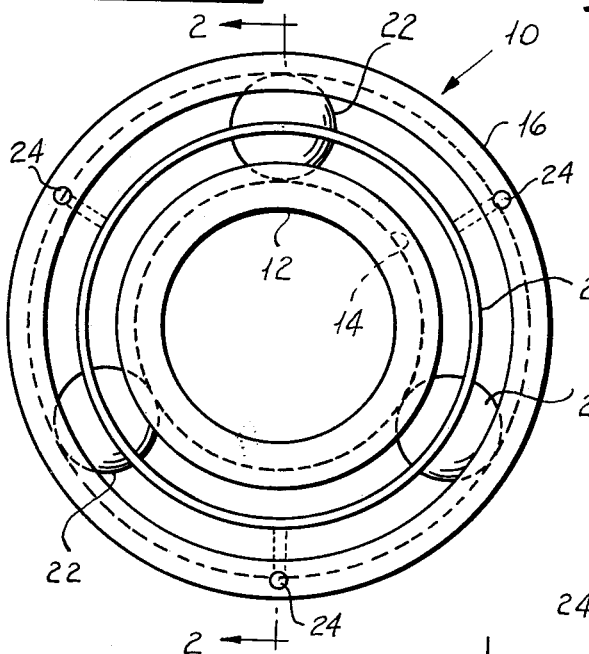
FIGURE 1 is a plan view of one form of our ball bearing variable resistor.
Figure 2:
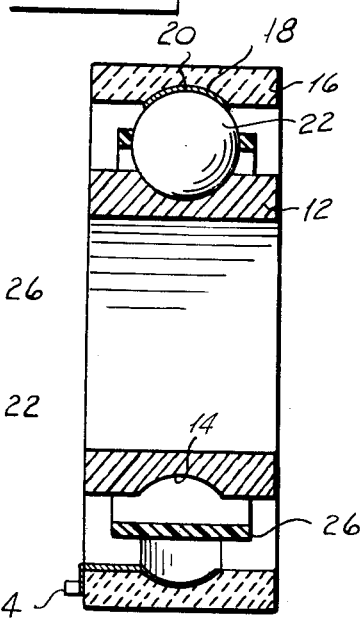
FIGURE 2 is a sectional view of the form of our ball bearing variable resistor shown in FIGURE 1 taken along the line 2—2 of FIGURE 1.

Referring to FIGURES 1 and 2 of the drawings, our ball bearing variable resistor, indicated generally by the reference character 10, includes an inner bearing ring 12 having a race 14. We form the inner ring 12 from any suitable conductive material such, for example, as steel. The variable resistor 10 includes an outer ring 16 formed from a ceramic or other hard insulating material. We form the outer ring 16 with an angular groove 18. We plate or otherwise coat the groove 18 with a conductive coating 20 of silver or chromium or the like having a predetermined resistance per unit length. It is to be understood that, as an alternative to coating an insulating outer ring with a conductive coating having a predetermined resistance per unit length, we may form the outer ring itself from a material such as a metallic-coated powder having the desired resistance characteristic.

We dispose conductive rolling elements such, for example, as balls 22 of steel between the inner ring 12 and the outer ring 16 in the race 14 and in the race formed by the resistive coating 20. We connect the resistive coating 20 to a number of electrical terminals 24 spaced around the outer ring 16. This may be accomplished in any suitable manner as by means of the conductive paint used in printed circuits. In the particular form of our invention shown in FIGURES 1 and 2, we connect three terminals 24 to the coating 20 at equally spaced points around the ring 16. A retainer 26 formed from a suitable insulating material retains the balls 22 in spaced relationship between the rings 12 and 16. In the form of our invention shown in FIGURES 1 and 2, adjacent balls 22 are spaced by approximately 120°.

Figure 3:
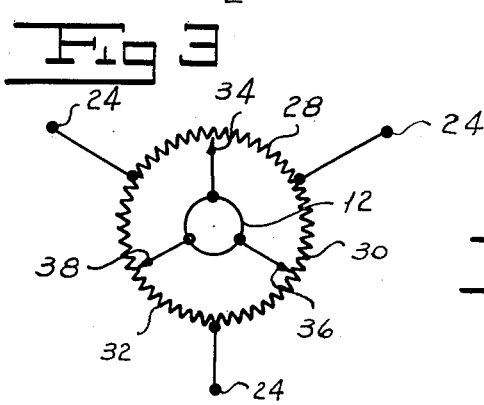
FIGURE 3 is a schematic diagram of the electrical circuit of the form of our ball bearing variable resistor shown in FIGURES 1 and 2.
Figure 4:
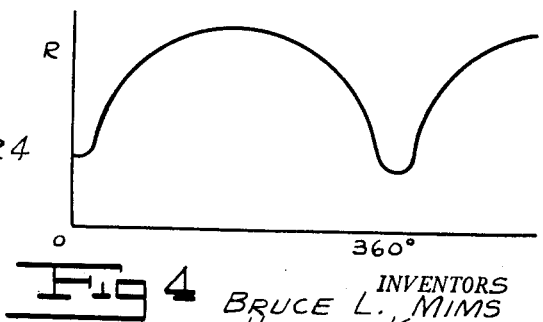
FIGURE 4 is a plot of resistance versus inner ring rotation showing the variation of resistance between a pair of terminals of the form of our ball bearing variable resistance shown in FIGURES 1 and 2 as the inner ring turns.

Referring now to FIGURE 3, which is a schematic representation of the form of our ball bearing variable resistor shown in FIGURES 1 and 2, it will be seen that the terminals 24 divide the resistance coating 20 into three sections to provide three resistances 28, 30, and 32 connected in a ring. We have represented the respective balls 22 of the form of our ball bearing variable resistor shown in FIGURES 1 and 2 as brushes 34, 36, and 38 in FIGURE 3. These brushes 34, 36, and 38 are connected to the conductive ring 12. It will be seen that each pair of adjacent brushes 34, 36, and 38 short-circuit one third of the resistance provided by the coating 20. As the inner ring 12 turns, the resistance between each pair of adjacent terminals 24 varies cyclically. For example, considering the resistance between the adjacent terminals 24 defining the resistance segment 28 with brushes 34 and 36 in contact with the portion of the coating 20 adjacent these terminals, the resistance between the terminals is a minimum determined by the resistance of the balls 22 and the resistance of the inner ring portions between the balls. As the ring turns, for example, in a clockwise direction, as viewed in the drawings, the resistance increases to a maximum at the point at which the ball represented by the brush 34 is at the midpoint of the resistance segment 28. This is the position of the brush 34 shown in FIGURE 3. As the inner ring continues to rotate, the resistance decreases to the same minimum. By choosing the proper combination of pitch diameter, ball diameter, and contact angle one revolution of the inner ring can be made to produce exactly one cycle of resistance. In this arrangement the balls of the bearing rotate around the bearing at approximately one-third the speed of the inner ring. We have shown this resistance characteristic of this form of our ball bearing variable resistor in FIGURE 4.

While we have shown in FIGURES 1 to 3 a form of our ball bearing variable resistor in which the terminals 24 are arranged to divide the coating 20 into three resistance segments 28, 30, and 32, it will readily be understood that many other configurations are possible. By way of example, we have shown in FIGURE 5 an alternate form of our invention in which a pair of terminals 40 and 42 divide the coating 20 into two resistance segments 44 and 46, each of which occupies 180°. In this form of our invention one cycle of resistance variation occurs in the course of each 60° of rotation of the inner ring. It will be understood also that in this form of our invention since there is no short-circuiting of the terminals 40 and 42 by a pair of balls 22, the device may be used as a potentiometer.

Figure 5:
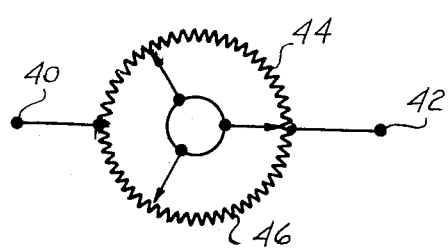
FIGURE 5 is a schematic diagram of an alternate form of our ball bearing variable resistor.
Figure 6:
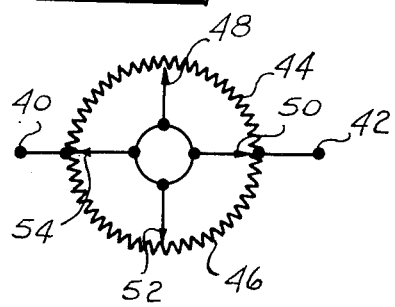
FIGURE 6 is a schematic view showing yet another form of our ball bearing variable resistor.

In still another form of our invention shown in FIGURE 6, two terminals 40 and 42 divide the resistance coating into two segments 44 and 46 in the same manner as in the form of our invention shown in FIGURE 5. In this form of our invention, however, we employ four balls 22 represented by brushes 48, 50, 52, and 54 in FIGURE 6. This form of our invention provides one cycle of resistance for each 90° of rotation of the inner ring 12. It will be appreciated by those skilled in the art that we employ at least three balls in all forms of our invention in order that the balls may perform their normal function of rotatably supporting an element such as a shaft as well as their function of providing electrical contact in accordance with our invention.

Referring now to FIGURE 7, we have shown an alternate form of our invention which is adapted to use as either a rotary phase shifter or as a potentiometer. This form of our variable resistor, indicated generally by the reference character 56, includes an inner ring 58 formed from a suitable ceramic or other hard insulating material, the groove 60 of which is provided with a coating 62 of conductive material such as silver or chromium or the like having the desired resistance per unit length. Respective terminals 64, 66, and 68 connected to the coating 62 divide the coating into three resistive segments. We connect respective flexible leads 70, 72, and 74 to the terminals 64, 66, and 68 to permit limited rotary displacement of the inner ring 58. We form the outer ring 76 of the device 56 from a suitable ceramic or other hard insulating material. We apply a suitable conductive material such, for example, as silver or the like to the groove of the ring 76 to provide three conductive segments 78, 80, and 82 separated by insulating segments 84. We connect respective terminals 86, 88, and 90 to the segments 78, 80, and 82. A retainer 92 formed from a suitable insulating material retains balls 94 in spaced relationship around the bearing between the rings 58 and 76.

With the respective phases of a three phase input applied to the terminals X, Y, and Z of the form of our variable resistor shown in FIGURE 7, the phase shifted phases appear at output terminals A, B, and C. When the inner ring 58 is displaced with respect to the outer ring 76, the output phases at terminals A, B, and C are shifted with respect to the input phases at terminals X, Y, and Z.

This form of our invention shown in FIGURE 7 also is adapted to use as a potentiometer. A source of potential, either alternating or direct current, is applied between a pair of terminals such as the terminals X and Y. In this case only one output terminal such, for example, as the terminal B is used so that the other terminals will not load the supply. As the inner ring 58 is displaced with respect to the outer ring 76, the potential at the output terminal B varies.

Referring now to FIGURE 8, we have shown a particular use of our ball bearing variable resistor. In this form of our resistor we form the inner ring 12 as a solid piece and provide it with slots 96 which permit the position of the inner ring to be adjusted by means of a screw driver or the like. We form the outer ring 16 with a concave surface to permit the resistor to be snapped into an opening 98 in a printed circuit board 100.

In use of the form of our ball bearing variable resistor shown in FIGURES 1 and 2, we connect a pair of adjacent terminals 24 to a point between which the variable resistance is desired. If a continuous cyclic variation of resistance is desired, the inner ring 12 may be continuously driven by a motor or the like. If it is desired merely to provide an adjustable resistance, any suitable means can be used to position the inner ring 12 to give the desired resistance between the terminals 24.

The balls 22 and the conductive inner ring 12 of our variable resistor act as a heat sink. The thin conductive film 20 has a large surface area with the result that it dissipates heat rapidly. Owing to these characteristics of our variable resistor, it has a high heat capacity. By the selection of suitable materials for our device, it can operate at high temperatures.

In use of the form of our invention shown in FIGURE 7 as a phase shifter, the respective phases of a three phase supply are applied to the terminals X, Y, and Z and the three shifted phases appear at the output terminals A, B, and C. As the inner ring 58 is displaced with respect to the outer ring 76, the output phases shift with respect to the input phases. In use of the form of our invention shown in FIGURE 7 as a potentiometer, we connect a suitable source of potential, either alternating or direct to a pair of adjacent inner ring terminals such as terminals X and Y. We use only one of the output terminals A, B, and C and the potential at this terminal varies with displacement of the inner ring 58.

It will be seen that we have accomplished the objects of our invention. We have provided a ball bearing variable resistor which is extremely small and compact. At least one rolling element of our resistor performs not only its normal function of supporting an element such as a shaft but also makes electrical contact with a resistance element. Our variable resistor requires only a very low torque. It has a high heat capacity and can operate at high temperatures. Further, our bearing is highly reliable and has a long life.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A ball bearing variable resistor including in combination, respective bearing rings having continuous annular races, rolling elements disposed between said rings in said races, a segment of one of said races being formed of material having a predetermined resistance per unit length, a conductive segment on the other one of said races, one of said rolling elements being formed of conductive material and being disposed between said conductive segment and said segment formed of resistance material to provide an electrical connection between said segments.

2. A ball bearing variable resistor including in combination a first bearing ring having a race formed of material having a predetermined resistance per unit length, a second bearing ring having a race formed of conductive material, a plurality of rolling elements disposed between said rings in said races to permit relative rotation therebetween, said rolling elements being formed of conductive material to provide electrical connections between said races and means for making electrical connections to said first bearing ring race.

3. A ball bearing variable resistor including in combination a first bearing ring having a race segment formed of material having a predetermined resistance per unit length, a second bearing ring having a race segment formed of conductive material, and at least three rolling elements disposed between said rings to permit relative movement therebetween, one of said rolling elements being formed of conductive material and being disposed in contact with said race segments.

4. A ball bearing variable resistor including in combination a first ring having a race formed of material having a predetermined resistance per unit length, a second ring having a race formed of segments of conductive material separated by insulation, three conductive balls disposed between said rings in said races, means for maintaining said balls in equally spaced relationship, means for making electrical connections to said first race at three equally spaced points around said first race and means for making electrical connections to said second race segments at three equally spaced points around said second race.

5. A ball bearing variable resistor including in combination an outer ring having a race formed of material having a predetermined resistance per unit length, an inner ring having a race formed of conductive material, a plurality of rolling elements formed of conductive material and disposed between said rings in said races and means for making electrical connections to said first ring race at spaced points around said first ring.

6. A ball bearing variable resistor including in combination an inner bearing ring provided with a continuous annular race, an outer bearing ring provided with a continuous annular race, a plurality of rolling elements for supporting said outer ring on said inner ring, a segment of one of said races being formed of resistive material, and a conductive segment on the other of said races, one of said rolling elements being formed of conductive material and being disposed between said conductive segment and said segment of resistive material to provide an electrical connection between said segments.

References Cited in the file of this patent

UNITED STATES PATENTS

| | | |
|---|---|---|
| 2,492,727 | Ballard | Dec. 27, 1949 |

FOREIGN PATENTS

| | | |
|---|---|---|
| 450,549 | Great Britain | July 20, 1936 |
| 712,787 | Germany | Oct. 2, 1941 |